United States Patent
Kim et al.

(10) Patent No.: US 10,937,244 B2
(45) Date of Patent: Mar. 2, 2021

(54) EFFICIENCY ENHANCEMENTS TO CONSTRUCTION OF VIRTUAL REALITY ENVIRONMENTS

(71) Applicant: Microsoft Technology Licensing, LLC, Redmond, WA (US)

(72) Inventors: Dong Back Kim, Bellevue, WA (US); Ricardo Acosta Moreno, Vancouver (CA); Jia Wang, Redmond, WA (US); Joshua Benjamin Eiten, Seattle, WA (US); Stefan Landvogt, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/168,800

(22) Filed: Oct. 23, 2018

(65) Prior Publication Data

US 2020/0126301 A1    Apr. 23, 2020

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/012* (2013.01); *G06F 3/04815* (2013.01); *G06F 3/04845* (2013.01); *G06T 15/005* (2013.01); *G06T 19/20* (2013.01); *G06T 2219/2004* (2013.01); *G06T 2219/2016* (2013.01)

(58) Field of Classification Search
CPC ..... G06T 19/006; G06T 15/005; G06F 3/012; G06F 3/04815; G06F 3/04845
See application file for complete search history.

(56) References Cited

U.S. PATENT DOCUMENTS 9,548,012 B1    1/2017  Sjoberg et al.
9,852,546 B2   12/2017  Kraver et al.
(Continued)

FOREIGN PATENT DOCUMENTS

WO    2004044664 A1    5/2004
WO    2014164901 A1   10/2014

OTHER PUBLICATIONS

"International Search Report and Written Opinion Issued in PCT Application No. PCT/US19/056408", dated Jan. 8, 2020, 15 Pages.
(Continued)

*Primary Examiner* — Sarah Lhymn
(74) *Attorney, Agent, or Firm* — Watson Patents, PLC; Vladan M. Vasiljevic

(57) ABSTRACT

The construction of virtual reality environments can be made more efficient with enhancements directed to the sizing of objects to be utilized in the construction of virtual reality environments, enhancements directed to the simultaneous display of multiple thumbnails, or other like indicators, of virtual reality environments being constructed, enhancements directed to controlling the positioning of a view of a virtual reality environment, enhancements directed to conceptualizing the virtual reality environment as perceived through different types of three-dimensional presentational hardware, and enhancements directed to the exchange of objects between multiple virtual reality environments being constructed.

20 Claims, 8 Drawing Sheets

(51) Int. Cl.
  *G06F 3/0481*  (2013.01)
  *G06F 3/0484*  (2013.01)
  *G06T 15/00*  (2011.01)
  *G06T 19/20*  (2011.01)

(56) References Cited

U.S. PATENT DOCUMENTS

| | | |
|---|---|---|
| 2005/0264527 A1 | 12/2005 | Lin et al. |
| 2008/0136775 A1 | 6/2008 | Conant |
| 2010/0259561 A1 | 10/2010 | Forutanpour et al. |
| 2013/0050432 A1 | 2/2013 | Perez et al. |
| 2013/0057475 A1 | 3/2013 | Duggan et al. |
| 2013/0100132 A1* | 4/2013 | Katayama ............ H04N 13/275 345/420 |
| 2013/0342570 A1 | 12/2013 | Kinnebrew et al. |
| 2015/0100910 A1 | 4/2015 | Luo et al. |
| 2015/0143276 A1 | 5/2015 | Luo |
| 2015/0301740 A1 | 10/2015 | Bozzini et al. |
| 2015/0358612 A1* | 12/2015 | Sandrew ............ H04N 5/23238 348/36 |
| 2016/0094835 A1* | 3/2016 | Takanashi .............. H04N 5/243 348/54 |
| 2016/0364138 A1 | 12/2016 | Luo et al. |
| 2017/0052702 A1 | 2/2017 | Norris, III |
| 2017/0200312 A1 | 7/2017 | Smith et al. |
| 2017/0212676 A1 | 7/2017 | Skinner et al. |
| 2018/0067646 A1 | 3/2018 | Chang et al. |
| 2018/0199039 A1 | 7/2018 | Trepte |
| 2018/0300953 A1 | 10/2018 | Kraver et al. |

OTHER PUBLICATIONS

"International Search Report and Written Opinion Issued in PCT Application No. PCT/US19/056409", dated Jan. 15, 2020, 12 Pages.
"Non Final Office Action Issued in U.S. Appl. No. 16/459,451", dated Aug. 27, 2020, 22 pages.

* cited by examiner

EFFICIENCY ENHANCEMENTS TO CONSTRUCTION OF VIRTUAL REALITY ENVIRONMENTS

BACKGROUND

Because of the ubiquity of the hardware for generating them, two-dimensional graphical user interfaces for computing devices are commonplace. By contrast, three-dimensional graphical user interfaces, such as virtual reality, augmented reality, or mixed reality interfaces are more specialized because they were developed within specific contexts where the expense of the hardware, necessary for generating such three-dimensional graphical user interfaces, was justified or invested. Accordingly, mechanisms for constructing virtual reality computer graphical environments are typically specialized to a particular application or context, and often lack functionality that can facilitate more efficient construction of virtual reality environments. Additionally, the fundamental differences between the display of two-dimensional graphical user interfaces, such as on traditional, standalone computer monitors, and the display of three-dimensional graphical user interfaces, such as through virtual reality headsets, as well as the fundamental differences between the interaction with two-dimensional graphical user interfaces and three-dimensional graphical user interfaces, render the construction of three-dimensional virtual reality environments unable to benefit, in the same manner, from tools and techniques applicable only to two-dimensional interfaces.

SUMMARY

The construction of virtual reality environments can be made more efficient with enhancements directed to the sizing of objects to be utilized in the construction of virtual reality environments, enhancements directed to the simultaneous display of multiple thumbnails, or other like indicators, of virtual reality environments being constructed, enhancements directed to controlling the positioning of a view of a virtual reality environment, enhancements directed to conceptualizing the virtual reality environment as perceived through different types of three-dimensional presentational hardware, and enhancements directed to the exchange of objects between multiple virtual reality environments being constructed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to enhancements, presented within a virtual-reality, three-dimensional computer-generated context, that render the construction of, and interaction with, virtual reality environments more efficient. Such enhancements include enhancements directed to the sizing of objects to be utilized in the construction of virtual reality environments, enhancements directed to the simultaneous display of multiple thumbnails, or other like indicators, of virtual reality environments being constructed, enhancements directed to controlling the positioning of a view of a virtual reality environment, enhancements directed to conceptualizing the virtual reality environment as perceived through different types of three-dimensional presentational hardware, and enhancements directed to the exchange of objects between multiple virtual reality environments being constructed.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
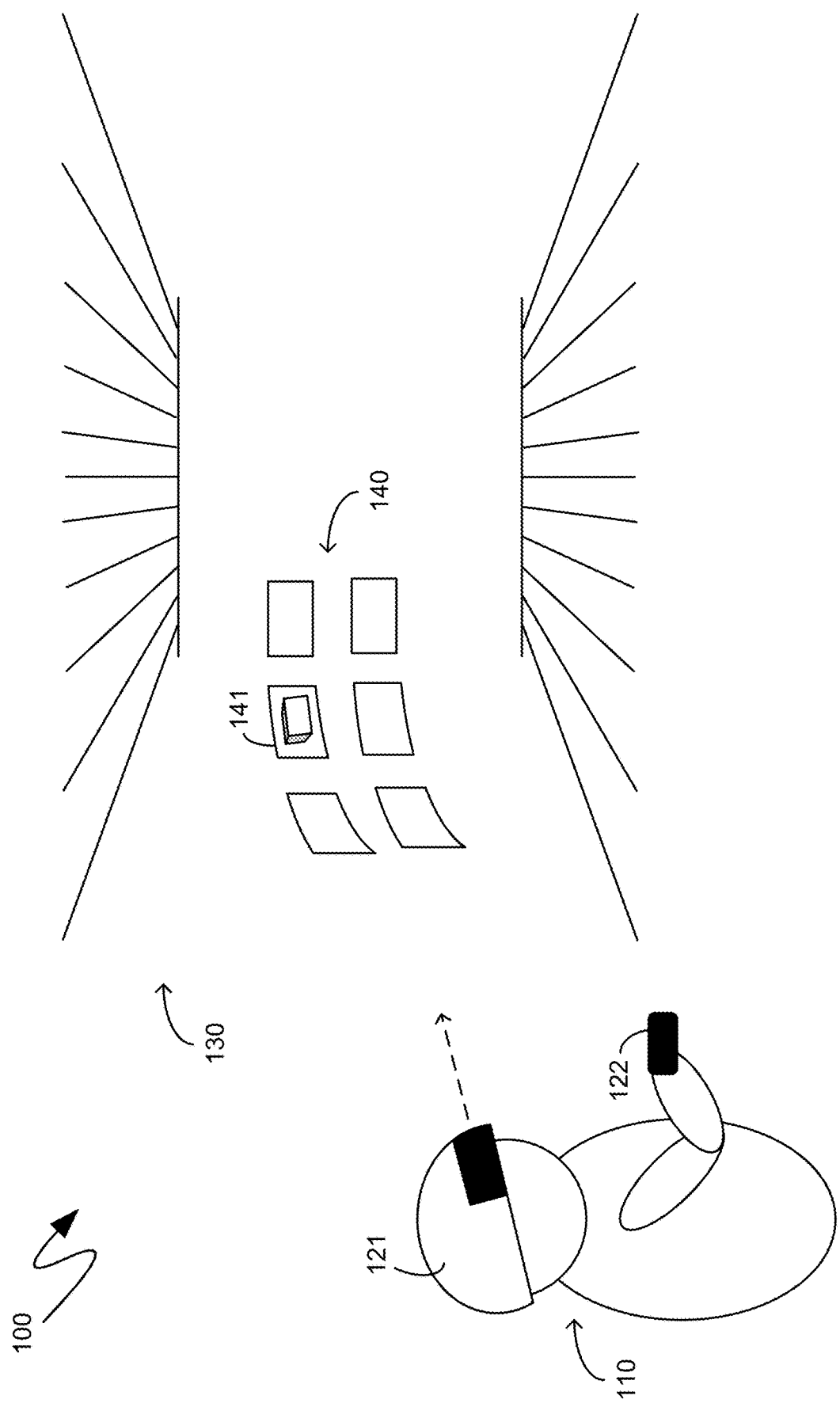
FIG. 1 is a system diagram of an exemplary enhancement directed to the simultaneous display of multiple thumbnails of virtual reality environments.

With reference to FIG. 1, an exemplary system 100 is illustrated, comprising a virtual reality interface 130, such as could be displayed to a user 110 on a virtual reality display device, such as the exemplary virtual-reality headset 121. The user 110 can then interact with the virtual reality interface 130 through one or more controllers, such as an exemplary hand-operated controller 122. As utilized herein, the term "virtual reality" includes "mixed reality" and "augmented reality" to the extent that the differences between "virtual reality", "mixed reality" and "augmented reality" are orthogonal, or non-impactful, to the mechanisms described herein. Thus, while the exemplary interface 130 is referred to as a "virtual reality" interface, it can equally be a "mixed reality" or "augmented reality" interface in that none of the mechanisms described require the absence of, or inability to see, the physical world. Similarly, while the display device 121 is referred to as a "virtual reality headset", it can equally be a "mixed reality" or "augmented reality" headset in that none of the mechanisms described require any hardware elements that are strictly unique to "virtual reality" headsets, as opposed to "mixed reality" or "augmented reality" headsets. Additionally, references below to "virtual reality environments" or "three-dimensional environments" or "worlds" are meant to include "mixed reality environments" and "augmented reality environments". For simplicity of presentation, however, the term "virtual reality" will be utilized to cover all such "virtual reality", "mixed reality", "augmented reality" or other like partially or wholly computer-generated realities.

The exemplary virtual-reality interface 130 can comprise thumbnails of three-dimensional virtual reality worlds or environments, such as the exemplary thumbnails 140. To provide a convenient mechanism by which the user 110 can identify which virtual reality environments the thumbnails 140 correspond to, each thumbnail, such as the exemplary thumbnail 141, can comprise a visual representation of the three-dimensional environment to which it corresponds. User action directed to such a thumbnail, such as the exemplary thumbnail 141, can result in the virtual reality interface 130 changing to present, to the user 110, the three-dimensional environment corresponding to the selected thumbnail.

As will be recognized by those skilled in the art, the rendering of a three-dimensional environment, such as to be displayed via the exemplary virtual-reality headset 121, can require substantial computational processing by one or more computing devices that are communicationally coupled to the virtual reality headset 121. In a similar manner, rendering a portion of a three-dimensional environment into a thumbnail, such as the exemplary thumbnail 141 can also require meaningful computational processing. Such processing can then be increased by six-fold merely in order to render portions of three-dimensional environments for each of the exemplary six multiple thumbnails 140. Because the presentation of the thumbnails 140 is meant to be an initiating interface, for which a user, such as the exemplary user 110, merely selects an environment with which the user will interact for a much more extended period of time, the consumption of massive amounts of computational processing in order to generate what is merely an initiating interface can be inefficient and can result in user frustration. However, without a visually indicative, and engaging, interface, users may seek to utilize alternative mechanisms.

Accordingly, according to one aspect, the thumbnails 140 can mimic a three-dimensional presentation of a portion of the three-dimensional environments represented by each individual one of such thumbnails utilizing only a two-dimensional graphic. For example, the two-dimensional graphic can be of a fixed size, such as a fixed pixel quantity and a fixed number of bits utilized to represent visual aspects of each pixel. Accordingly, the memory requirements for each individual thumbnail can be known in advance, in such thumbnails can be preloaded, or the memory for such thumbnails can be reserved in advance, further increasing rendering performance beyond that of the mechanisms described below.

Figure 2:
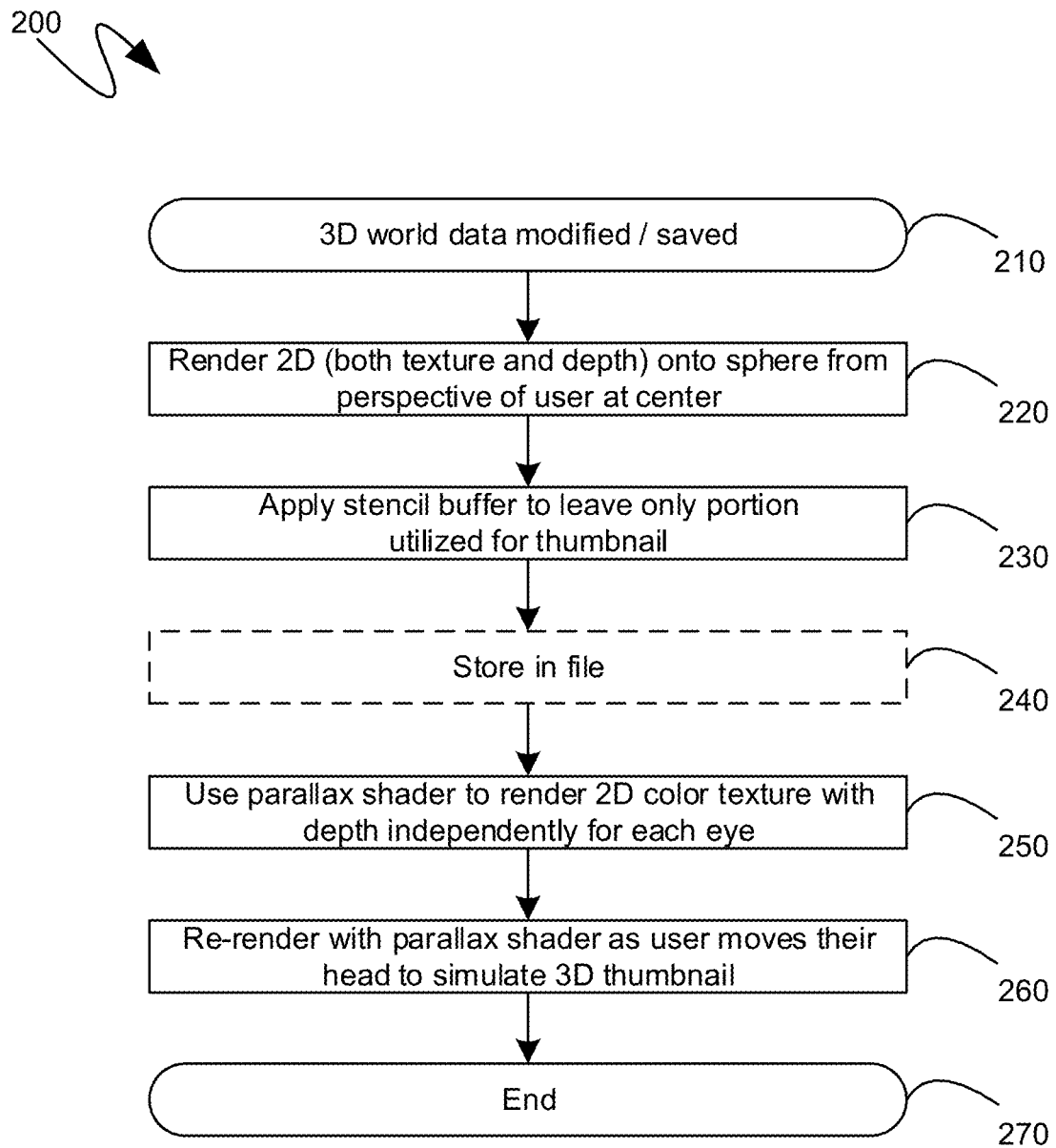
FIG. 2 is a flow diagram of an exemplary enhancement directed to the simultaneous display of multiple thumbnails of virtual reality environments.

Turning to FIG. 2, the exemplary flow diagram 200 shown therein illustrates an exemplary series of steps by which thumbnails of three-dimensional environments can be represented in a visually engaging manner, by simulating a three-dimensional view of a portion of such three-dimensional environments, while utilizing only two-dimensional graphics. Initially, at step 210, three-dimensional data of a three-dimensional environment can be received as input to generate a thumbnail. According to one aspect, such thumbnail generation can be performed in advance of the presentation of such thumbnails to a user, such as in the manner illustrated in FIG. 1. Accordingly, a trigger for the pre-generation of such thumbnails can be the modification of a three-dimensional environment. Another trigger for the pre-generation of such thumbnails can be the saving of a three-dimensional environment, such as to a non-volatile storage medium.

The generation of the thumbnails can commence, at step 220, with the rendering of the three-dimensional environment onto a two-dimensional surface as a two-dimensional object, with each pixel on the surface having texture information and depth information, with the latter derived from the spatial location, within the three-dimensional environment, of the objects in that environment as compared with the location of the observer for purposes of the rendering. More specifically, the three-dimensional environment can be rendered onto the two-dimensional surface of the inside of a sphere, with such rendering occurring as if the observer was positioned at the center of the sphere. The depth information applied to each pixel of such a two-dimensional projection can be calculated, in a known manner, based on the position of the observer and the position of objects within the three-dimensional environment. Such depth information is sometimes stored, or referred to, as a "z-buffer".

Subsequently, at step 230, a stencil buffer, or other like filtering, can be applied to reduce the spherical two-dimensional rendering to a portion utilizable as a thumbnail. For example, a rectangular stencil buffer can be applied to a predetermined portion of the sphere, such as a portion representative of the observer looking "straight ahead", level to the ground of the three-dimensional environment. As another example, a representative portion of the spherical two-dimensional rendering can be selected based on a quantity of objects rendered into the representative portion. In such an example, the stencil buffer, or other like filtering, can seek to filter out portions of the spherical two-dimensional rendering that have no objects, or very few objects, rendered onto them. Is yet another example, a representative portion of the spherical two-dimensional rendering can be selected based on heuristic analysis. For example, interactions of the user with the three-dimensional environment can be monitored, and the stencil buffer can be applied so as to filter out portions of the three-dimensional environment, as rendered onto the spherical two-dimensional surface, that the user interacts with least frequently, or for a least aggregate quantity of time.

After application of the stencil buffer, or other like filtering, at step 230, the resulting two-dimensional image, having both texture and depth information for each pixel, can be stored in a file at step 240. Exemplary flow diagram 200, shown in FIG. 2, illustrates step 240 via dashed lines to indicate that it is an optional step. Such a two-dimensional image can also be retained in memory, can be stored with the data of the three-dimensional environment, or can otherwise be retained, or simply regenerated when needed.

According to one aspect, each thumbnail can be a specific size, such as a specific quantity of pixels in width, height and texture and depth information. For example, each thumbnail can be 1024-by-768 pixels, with each pixel having eight bits of information to represent texture and another eight bits of information to represent depth. According to another aspect, each thumbnail can be one of the predefined size template, such as, for example, a 1024-by-768 pixel template, a 1600-by-1200 pixel template, and so on. Utilizing such fixed sizing and quantity of bits per pixel, the two-dimensional graphical image size of each thumbnail can be bounded. Accordingly, a quantity of memory can be reserved, or otherwise set aside, and the relevant thumbnails can be preloaded to achieve greater efficiencies in their display to the user within a three-dimensional virtual reality environment, such as that illustrated in FIG. 1.

Continuing with the flow diagram 200 of FIG. 2, the display of individual thumbnails to a user within a three-dimensional virtual reality environment can commence with step 250, where a parallax shader can be utilized to render each pixel of the two dimensional thumbnail in the three-dimensional virtual reality environment such that the positioning and color texture applied to such a pixel can be based on the depth information of that pixel and the position of the user in the three-dimensional virtual reality environment. As will be understood by those skilled in the art, parallax shading accounts for angular differences between how a two-dimensional surface, having a certain texture, would be perceived by a user and how a three-dimensional surface, with the same texture, would be perceived by the user if that three-dimensional surface had a depth corresponding to the depth information retained with the two-dimensional surface. Accordingly, parallax shading applies colorimetric variations, positional variations, or combinations thereof, to individual pixels to simulate the perception of depth without utilizing three-dimensional information, and, instead, limited only to the two-dimensional information having depth information associated with it.

Within the context of a three-dimensional virtual reality environment, such an environment can be graphically presented to the user through virtual-reality headsets, such as the exemplary virtual-reality headset 121, shown in FIG. 1. As will be recognized by those skilled in the art, such virtual reality headsets typically comprise two independent displays, with each eye of the user viewing only one of those displays. Slight differences in the graphics presented by those two independent displays enable the user's brain to perceive a three-dimensional virtual reality environment. Accordingly, at step 250, the utilization of the parallax shader can be performed independently, or otherwise separately, for each eye, with the positional differences between the user's eyes resulting in slight differences in how the parallax shader adjusts the textures, colors, positions and other like graphical aspects of the individual pixels of a two-dimensional thumbnail image.

As the user moves the virtual reality headset, the positioning of the user's eyes, as compared with the displayed position of each individual thumbnail, can change. Accordingly, at step 260, the parallax shader can be utilized to re-render, again, separately for the left and right eyes, the two-dimensional thumbnail image. The resulting effect is that the user perceives a thumbnail image in a three-dimensional manner, because different portions of the thumbnail image respond differently, in a graphical, or visual, sense, to the user's head movement, with such differences resulting in the user's brain applying a three-dimensional interpretation to the thumbnail image. In such a manner, multiple thumbnail images of three-dimensional environments can be presented to the user without incurring the computational cost of rendering multiple three-dimensional environments. Instead, as demonstrated, such thumbnail images can be visually engaging and evocative of three-dimensional images while comprising the reduced memory and processor requirements of only two-dimensional images.

Figure 3:
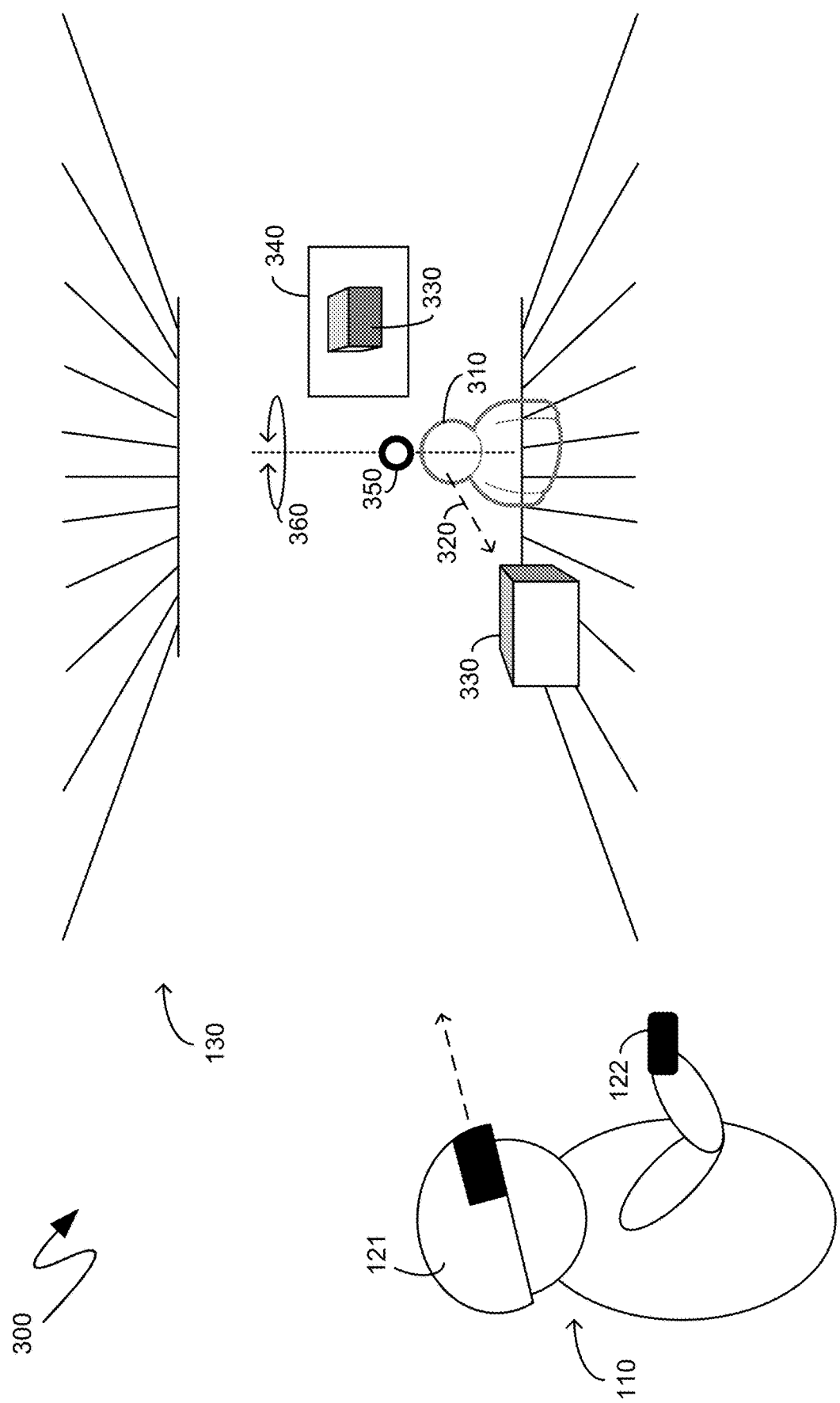
FIG. 3 is a system diagram of an exemplary enhancement directed to the controlling of the positioning of a view of a virtual reality environment.

Turning to FIG. 3, the exemplary system 300 shown therein illustrates an exemplary virtual reality interface 130 comprising enhancements for facilitating the positioning of views within the three-dimensional environment. More specifically, in some instances it may be desirable to allow users to jump to specific points or locations within the three-dimensional environment. For example, if the three-dimensional environment is being utilized to train individuals regarding a particular piece of equipment, it may be desirable to allow individuals to jump from one point in the three-dimensional environment to another so that the view of the piece of equipment that is the focus of the training is consistent, thereby facilitating the conveyance of training information.

As will be recognized by those skilled in the art, however, jumping to points within a three-dimensional environment can be disorienting, and can require time while the user swivels their head, or otherwise attempts to obtain contextual information to understand their new position and orientation. Such time can be magnified if the computing hardware being utilized is underpowered, or is otherwise taxed to regenerate portions of the three-dimensional environment while the user swivels their head to obtain their bearings at the new position.

According to one aspect, therefore, a ghost user, such as the exemplary ghost user 310 can be generated within the virtual reality interface 130, enabling a user to contextually, within the three-dimensional environment, understand their position and orientation once they jump to that new location. Such a visual representation of a user's position and orientation can be facilitated by the display of a representation of the user, or other like visual indicator of the user's position and orientation. The exemplary ghost user 310 comprises a visual representation of a user, except visually detuned, such as through transparency or other like visual cues. The exemplary ghost user 310 can further include a visual representation 320 of an orientation of the ghost user 310. Such a visual representation 320 can be a simple arrow or positional indicator, or can be achieved by a more visually accurate ghost user 310 that can, for example, include facial features to facilitate visually representing the orientation of the view once a user jumps to that position.

An additional enhancement to facilitate a user's conceptualization and visualization of their position and orientation after a jump can include a preview window, such as the exemplary preview window 340. More specifically, the above-described mechanisms for generating a visually engaging thumbnail, that appears three-dimensional, from a two-dimensional rendering can be utilized to generate a preview window, such as the exemplary preview window 340, that can display, in an analogous manner, a view of the three-dimensional environment shown in the virtual reality interface 130, except from the viewpoint of a user at a position and orientation represented by the ghost user 310. Alternatively, other mechanisms for generating the exemplary preview window 340 can likewise be utilized. Thus, as illustrated by the exemplary system 300 shown in FIG. 3, the perception of the block 330 can change, from its representation in the exemplary virtual-reality interface 130, showing the three-dimensional environment as would be perceived by the user 110, to its representation in the exemplary preview window 340, showing the three-dimensional environment as would be perceived by a user represented by the ghost user 310.

According to one aspect, the ghost user 310 can be manually adjusted, as illustrated by the arrows 360, by the user 110. For example, the virtual reality interface 130 can enable the user 110, utilizing the controller 122, to "grab" the ghost user 310 and rotate the ghost user 310 so that the ghost user 310 is positioned, or otherwise oriented, in a manner desirous by the user 110. According to one aspect, adjustment of the ghost user can be limited to the horizontal plane, such as, for example, to prevent orientation of the ghost user 310 in an upside down or otherwise vertical configuration that may result in disorientation when a user jumps to the position and orientation represented by the ghost user 310. Alternatively, or in addition, adjustment of the ghost user can include vertical adjustments, such as to focus the orientation 320 of the ghost user 310 onto, for example, an object near the floor, such as, for example, the exemplary block 330, as opposed to, for example, an object closer to the ceiling, or up in the air. Adjustment of the ghost user 310 can be reflected by the positioning and visual representation of the ghost user 310. Additionally, the preview window 340 can be updated in accordance with such adjustment of the ghost user 310, so that the preview window 340 continues to display what a user would see if they jumped to the position and orientation represented by the ghost user 310.

To reduce a quantity of digital processing required to implement the exemplary system 300 shown in FIG. 3, the exemplary preview window 340 can be displayed only temporarily. For example, the preview window 340 can be initiated when the user 110 initiates interaction with the ghost user 310, and can then be terminated when the user 110 terminates interaction with the ghost user 310. As another example, the preview window 340 can be initiated in terminated based on heuristic or predictive analysis. For example, the preview window 340 can be initiated when actions by the user 110 are indicative of a user intent to interact with the ghost user 310, such as approaching the ghost user 310, reaching out towards the ghost user 310, or other like predictive actions.

To facilitate fine-tuning of a position or orientation of the ghost user 310, a hotspot or viewpoint trigger 350 can be presented, such that user action directed to the viewpoint trigger 350 can enable the user 110 to jump to the position and orientation of the ghost user 310. The user 110 can then adjust the ghost user's position and orientation through their own actions, such as by turning their head, and can then jump back, and the position and orientation of the ghost user 310 can remain fixed in the position and orientation last taken by the user 110 when the user 110 jumped to the position of the ghost user 310, such as through user action directed to the trigger 350. User action directed to the trigger 350 can include transient user action, such as a transient action directed to the trigger 350, whereby, to jump back, the user 110 can perform a similar transient action, such as a click, a grab, or other like transient action. Alternatively, user action directed to the trigger 350 can include temporally extended user action, such as a click and hold, or a continuous depressing of a specific button, such as on the controller 122. In such an instance, user termination of the temporally extended user action can result in the user jumping back to their original position. In such a manner, a user can efficiently transition between their current position within a virtual reality environment, and a subsequent position in the virtual reality environment, thereby enabling the user to efficiently conceptualize and adjust the subsequent position.

In addition to adjusting a position and orientation of the ghost user 310, other adjustments can include a size of the ghost user 310. Thus, for example, should a broader view be desired, the user 110 could, for example, increase the size of the ghost user 310 such that, upon jumping to a position represented by such a ghost user 310, the user 110 would view the virtual reality environment from above and at a distance. As another example, the user 110 could decrease the size of the ghost user 310 such that, upon jumping to a position represented by such a ghost user 310, the user would view a particular portion of the virtual reality environment up close.

Other adjustments to the ghost user 310, within the context of the virtual reality environment, are equally contemplated.

Figure 4:
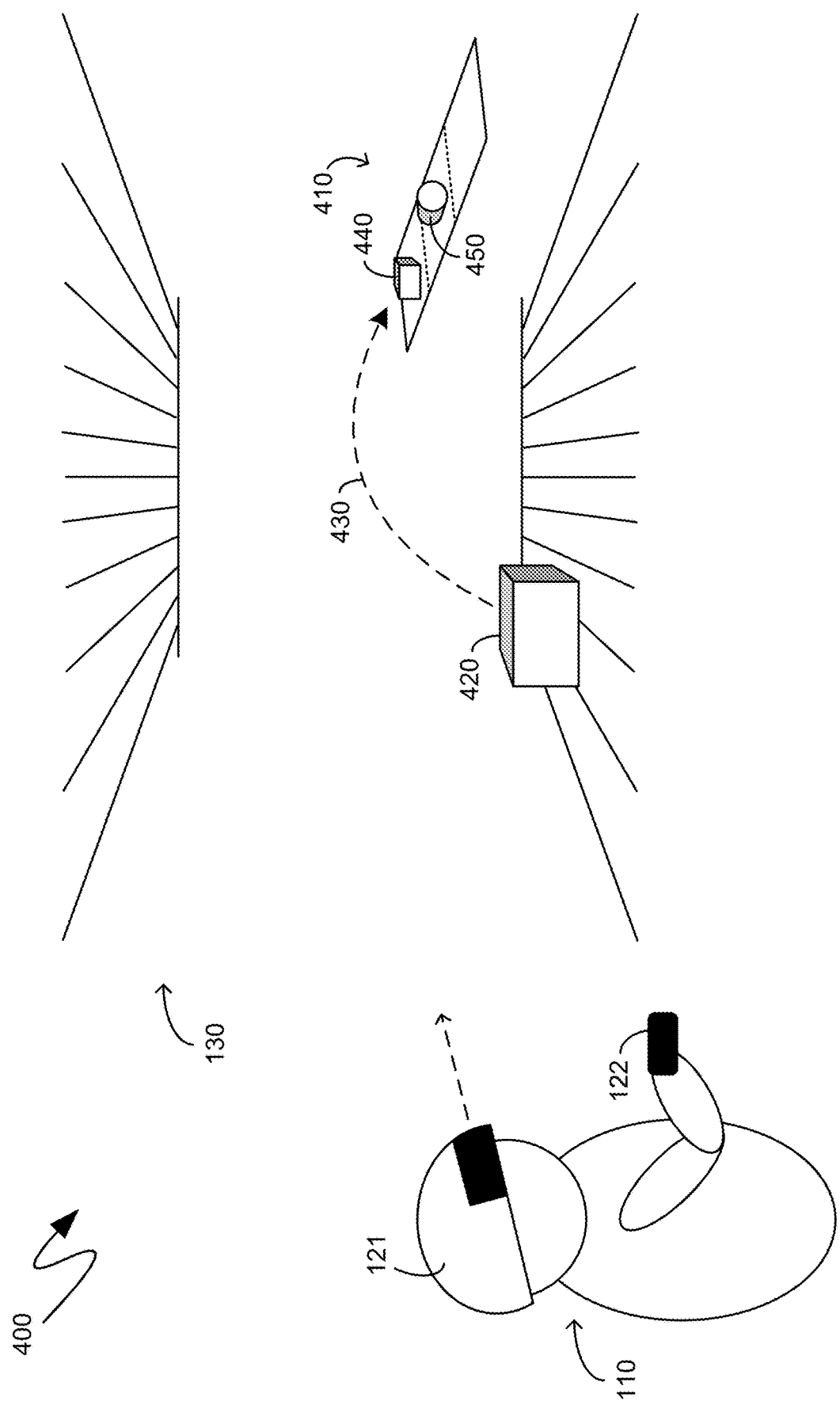
FIG. 4 is a system diagram of an exemplary enhancement directed to the exchange of objects between multiple virtual reality environments.

Turning to FIG. 4, the exemplary system 400 shown therein illustrates an enhancement by which objects can be exchanged among virtual reality environments, or otherwise made available for easy placement and access. More specifically, the exemplary virtual-reality interface 130 includes a shelf 410, or similar visual motif, which can represent a clipboard or other like object storage and access functionality. A user can move objects to the clipboard, and, thereby, achieve a "cut" command in a natural and intuitive manner. For example, utilizing the controller 122, the user 110 can "grab" the block 420 within the context of the virtual-reality interface 130 and move it, as illustrated by the action 430, to the shelf 410. Upon detecting the move 430, the computer-executable instructions generating the virtual-reality interface 130 can visually shrink the object 420, such as to the visually shrunk object 440, and place it on the shelf 410, thereby removing it from the virtual reality environment being edited. In a similar manner, a user can "grab" objects from the shelf 410 and move them into the virtual reality environment, thereby achieving a "paste" command in a natural and intuitive manner.

According to one aspect, the visual representation of the shelf 410 can be divided into discrete and identified portions, such that objects in the clipboard, visually displayed on the shelf 410, can be delineated and differentiated from one another. Thus, for example, the exemplary object 440 is shown as being on a discrete portion of the shelf 410, separate from the object 450. Such a visual paradigm can enable user to differentiate between a single group of objects, treated as a singular entity for purposes of being inserted into a virtual reality environment, and multiple separate objects.

The visual representation of the shelf 410, and the corresponding size modification of an object placed upon it, can be performed in a visually engaging manner. For example, the shelf 440 can be grayed out, transparent, invisible, or otherwise displayed in a visually unobtrusive manner. Subsequently, upon detection of user action indicative of seeking to place objects upon the clipboard, such as the exemplary move 430, the shelf 410 can become more visible, or can increasing visibility as the object 430 is moved 440 towards the shelf. Similarly, the exemplary object 420 can slowly shrink in visual size as it approaches the shelf 410.

A magnetic visual effect can likewise be utilized to facilitate user interaction with the shelf 410. For example, a user releasing the object 420 proximate to a position on the shelf 410 can entail the visual presentation of the object sliding over to a center part of the delineated position. Similarly, minor movements by the user, such as via the controller 122, can be ignored, thereby conveying a magnetic attraction, such as to a specific portion of the shelf 410, which can only be overcome by larger movements. In such a manner, the user's interaction with the shelf 410 can be visually provided in an engaging manner.

According to one aspect, a "copy" functionality can be achieved by first cloning an object, such as the exemplary object 420, and then moving the cloned object to the shelf 410, thereby leaving the original object 420 in its original location within the current three-dimensional environment. Such clone functionality can be implemented through specific actions or user input directed to the controller 122.

The data of three-dimensional objects, such as the exemplary object 420, can be formatted in accordance with a data representation format of an application presenting the three-dimensional environment. According to one aspect, the movement of objects, such as the exemplary object 420, to the shelf 410, representative of a "cut" command, can result in the data of such an object being removed from a current three-dimensional environment and stored, in an unmodified form, in a data structure associated with clipboard functionality. A subsequent movement of an object, such as the exemplary object 440, off of the shelf 410, representative of a "paste" command, can result in the data of such an object being reinserted into the current three-dimensional environment in an unmodified form from that stored in the clipboard data structure.

According to another aspect, the data of objects in the clipboard can be converted to a standard format, such as one or more JSON files, which can then facilitate the import of such objects into different virtual reality environments, different application programs, or combinations thereof. For example, a user can identify, such as through the interface shown in FIG. 4, one or more objects on the shelf 410 that can be made to be exportable, such as by saving them to a non-volatile storage medium. Such objects can then be imported, or "pasted", into other applications and/or virtual reality environments based on a conversion between a format of the object as saved, such as in a JSON file, and a format of three-dimensional objects utilized by such other applications and/or virtual reality environments.

Figure 5:
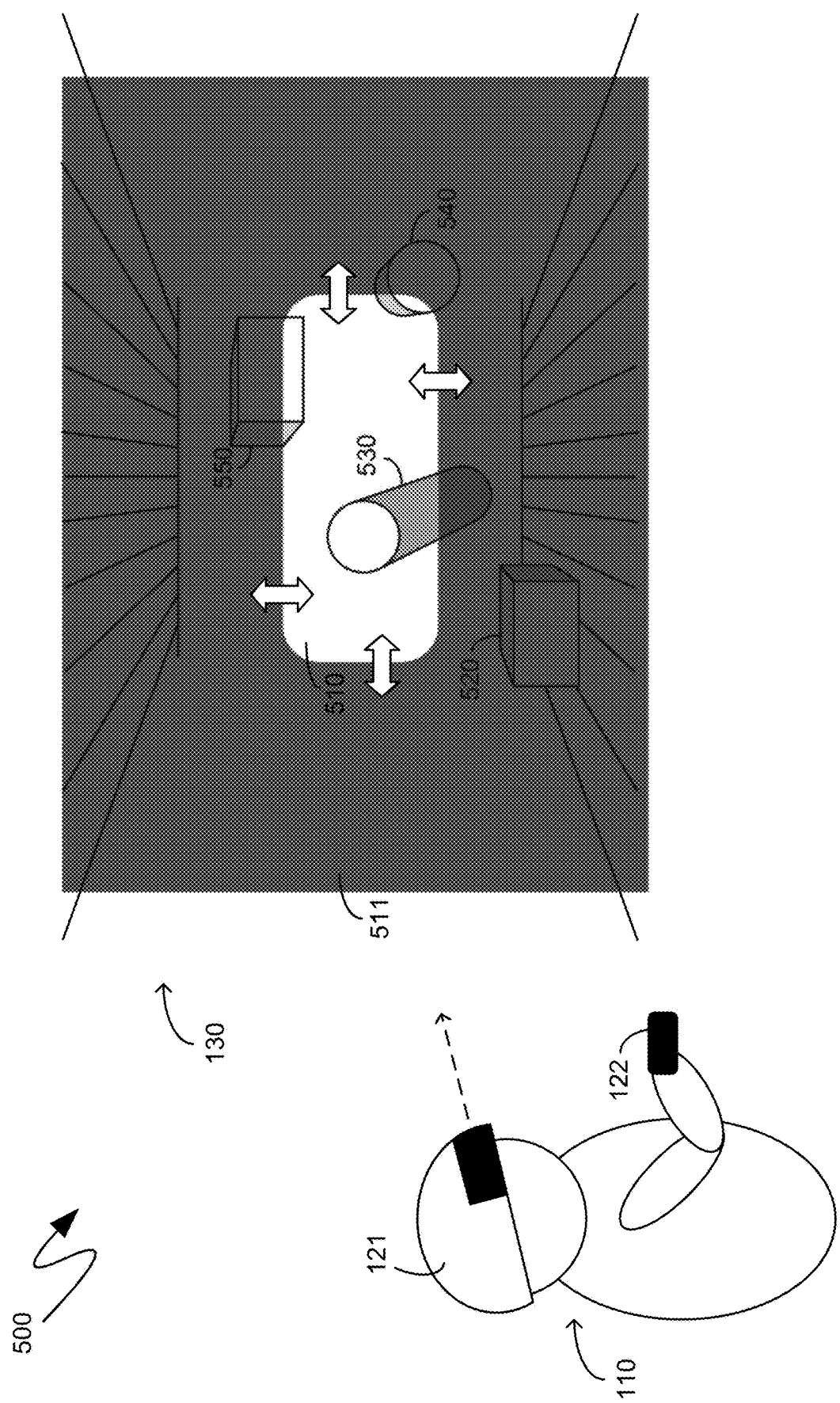
FIG. 5 is a system diagram of an exemplary enhancement directed to the conceptualization of the virtual reality environment as perceived through different types of three-dimensional presentational hardware.

Turning to FIG. 5, the exemplary system 500 shown therein illustrates an exemplary enhancement by which the user 110 can visualize a three-dimensional environment as it would be perceived through alternative virtual reality hardware. For example, different virtual reality hardware, including virtual reality headsets, augmented reality headsets, mixed reality headsets, and the like, may have different fields of view and different visual perceptions by users utilizing such headsets, with such differences being based upon physical differences in the display technology utilized by such headsets, and the position and orientation of such display technology with respect to a user's eyes. Accordingly, a frame 510 can be overlaid over the virtual reality interface 130, thereby visually deemphasizing portions 511 of the virtual reality interface 130 that would not be perceived by a user utilizing an alternative virtual reality hardware. Thus, for example, while the user 110, utilizing the virtual reality headset 121, may perceive all of the blocks 520, 530, 540 and 550 within the virtual reality interface 130 presented by the virtual reality headset 121, a user utilizing a different type of virtual reality headset may only perceive those portions of the blocks 530, 540 and 550 visible through the frame 510. In such a manner the user 110 can design a three-dimensional environment that can be utilizable by users of other virtual reality hardware.

Known virtual-reality hardware can have its views determined in advance, and preprogrammed frames, such as the exemplary frame 510, can be provided for such known hardware. Alternatively, or in addition, as illustrated by the arrows in FIG. 5, the field of view provided by virtual reality hardware, that is simulated by the exemplary frame 510, can be modified by the user 110 to suit the user's needs. Such modification can entail increasing the height and width of such a field of view, as illustrated by the arrows in FIG. 5. Such modification can also entail adjusting a zoom, magnification, or other like perception of depth.

Figure 6A:
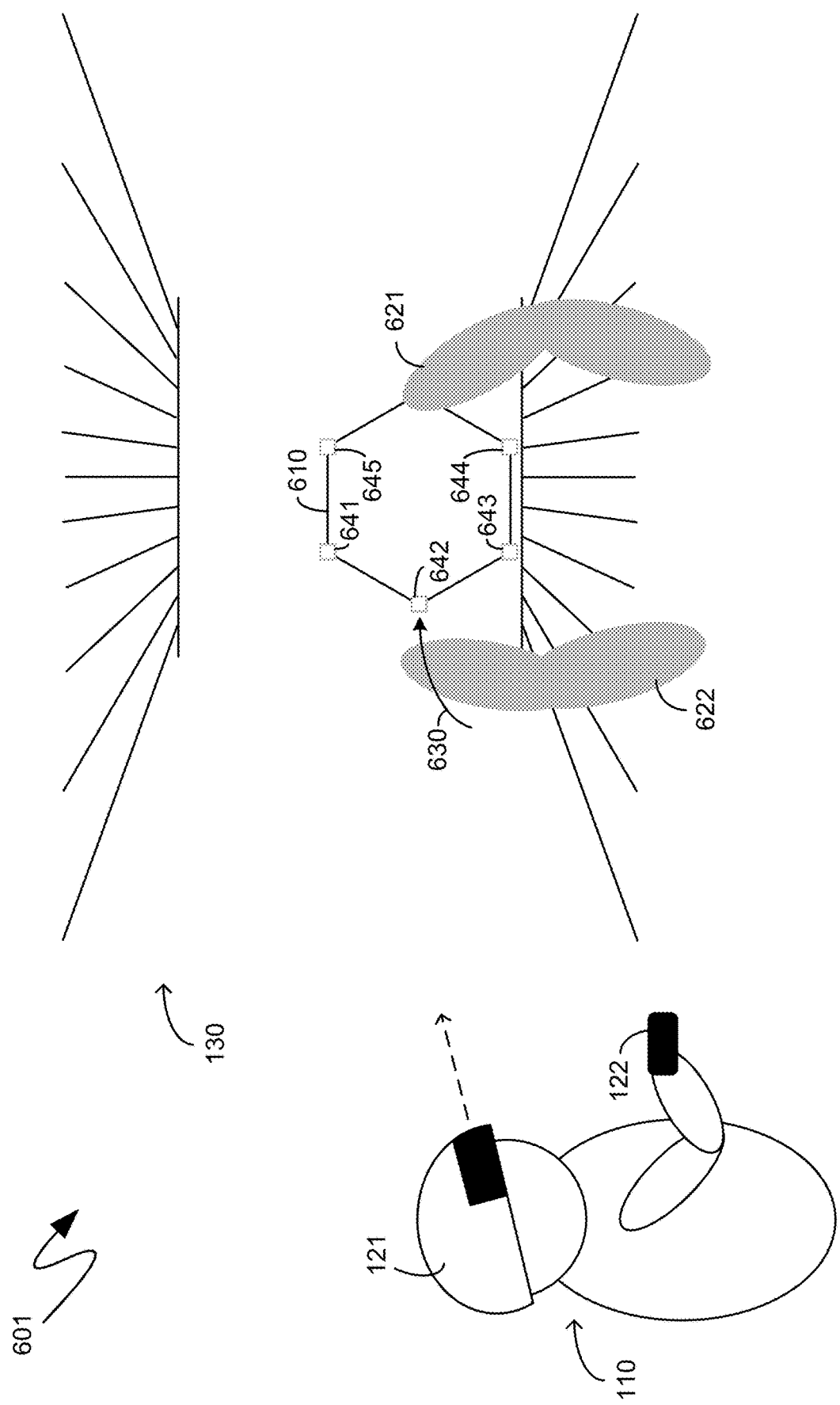
FIGS. 6a and 6b are system diagrams of an exemplary enhancement directed to the sizing of objects in virtual reality environments.

Turning to FIG. 6a, the exemplary system 601 shown therein illustrates an exemplary enhancement to the manipulation of a size of objects within the virtual reality environment. More specifically, the exemplary virtual-reality interface 130 can include visual representations, within the virtual reality environment, of the arms of the user 110, visualized as the arms 621 and 622. A user can "grab" an object, such as the exemplary object 610, utilizing input provided via the controller 122. According to one aspect, the object 610 can be scaled in a uniform manner through a convenient command accessible to the user via the controller 122. For example, once a user has grabbed the object 610, such as illustrated by the arm 621, user action to a slider, thumbwheel, joystick, dial, or other like user input hardware on the controller 122 can result in the grabbed objects 610 being uniformly scaled, either larger or smaller, depending on a direction or type of input directed to the aforementioned user input hardware on the controller 122. As yet another example, if the controller 122 provides multiple inputs, different inputs can result in different types of uniform scaling. For example, a joystick can uniformly scale the grabbed object 610 in a continuous manner if operated in a forward/back (or up/down) direction, but operation in an orthogonal direction (such as left/right) can result in the grabbed object 610 being uniformly scaled in a step-wise manner, such as by 25% increments, 10% increments, or the like. Other forms of user input received through the controller 122 can be similarly divided such that one type of input results in one type of uniform scaling, such as linear uniform scaling, with other inputs result in other types of uniform scaling, such as stepwise scaling.

According to another aspect, the object 610 can be scaled in a nonuniform manner, such as by being stretched, skewed, or other like nonuniform size manipulation, by the use of a second arm of the user 110, such as the arm represented by the arm representation 622. More specifically, the object 610, once it is grabbed by the arm 621, can display anchor points to facilitate resizing, such as the exemplary anchor points 641, 642, 643, 644 and 645. While the exemplary anchor points 641, 642, 643, 644 and 645 are illustrated as being positioned on vertices of the object 610, they could equally be positioned on extremities, line segments, center points, or any other like position on the object 610. Alternatively, or in addition, the anchors of an object need not even be points, but can instead, be contiguous shapes, such as a ring around a capsule that can then be utilized to resize the diameter of the capsule in a manner analogous to that described herein with reference to anchor points. Additionally, the exemplary anchor points 641, 642, 643, 644 and 645 can be visible once the object is grabbed by the arm 621. Alternatively, the exemplary anchor points 641, 642, 643, 644 and 645 can become visible only when an appropriate action, such as the movement 630 of the other arm 622 towards the grabbed object 610, is detected. The visibility of the exemplary anchor points 641, 642, 643, 644 and 645 can slowly increase as the arm 622 moves closer, or their display can be triggered in a more binary, and less linear, manner.

As with the exemplary shelf described above, the exemplary anchor points 641, 642, 643, 644 and 645 can have a magnetic effect to them such that the arm 622 can be "attracted" to one of the exemplary anchor points 641, 642, 643, 644 and 645. For example, as the arm 622 approaches the anchor point 642, slight inaccuracies in the position of the arm 622 can be ignored in the position of the arm 622 can be "snapped to" the anchor point 642. In a similar manner, movement of the arm 622 away from the anchor point 642 can require a greater degree of movement prior to visually displaying such movement, to thereby represent a "magnetic stickiness" between the position of the arm 622 and the anchor point 642.

Figure 6B:
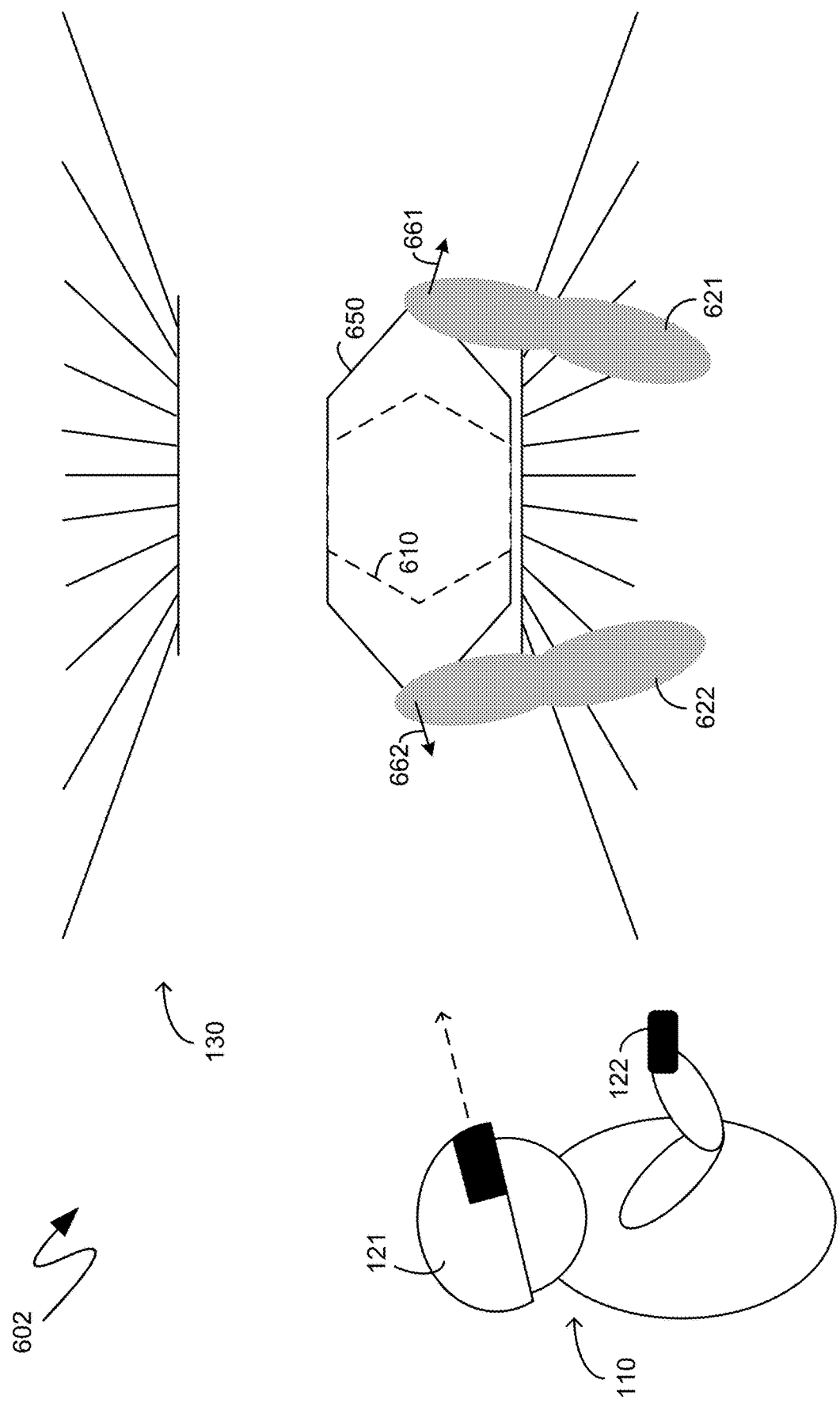

Once an object, such as the exemplary object 610, has been grabbed by both arms, it can be resized in a nonuniform manner. For example, turning to FIG. 6b, the exemplary system 602 shown therein illustrates the arms 621 and 622 moving apart, as illustrated by the actions 661 and 662. Correspondingly, the object 610 has been stretched into the object 650 in accordance with the movement of the arms 661 and 662.

According to one aspect, the stretching of the object 610, into the object 650, can be along an axis defined by the two points at which the object was interacted with by the arms 621 and 622. For example, in the example illustrated in FIG. 6b, the object can have been grabbed such that a horizontal axis was formed between the two grab points. Accordingly, the stretching of the object 610 into the object 650 can be fixed along the horizontal axis. Thus, for example, slight motion along other axis, such as is illustrated by the move actions 661 and 662, can be ignored or otherwise filtered out in the stretching of the object 610 into the object 650. Alternatively, or in addition, movement along other axis can be interpreted as translational or rotational movement, as opposed to nonuniform resizing. Stated differently, nonuniform resizing can occur along a fixed axis, while movements along the other axis can result in translation or rotation of the stretched object 350. The axis of stretching can be determined by the two points at which the object was interacted with by the arms 621 and 622 and can, therefore, be independent of the up-down, left-right and front-back axes of the virtual environment.

A quantity of stretching, skewing, or other like nonuniform resizing, such as a scale applied along an axis of nonuniform resizing, can be based on a ratio between a distance between the arms 621 and 622 when the second of those arms grabbed an anchor point, and a current distance between the arms 621 and 622. In such a manner, a user can move either the arm 621 or the arm 622 to achieve nonuniform resizing. Alternatively, movement of a single arm can result in nonuniform resizing of only a portion, such as a half, along the axis of nonuniform resizing, corresponding to the moving arm. Thus, for example, if the user had moved arm 621 in FIG. 6b, but had kept arm 622 in a fixed position, the exemplary object 610 could have been stretched along the right-hand side of the object, as it would have been viewed in the interface illustrated in FIG. 6b, but not along the left-hand side of the object.

In such a manner, a user can be enabled to resize objects in a virtual reality environment, in both uniform and nonuniform ways, in an intuitive and engaging manner.

Figure 7:
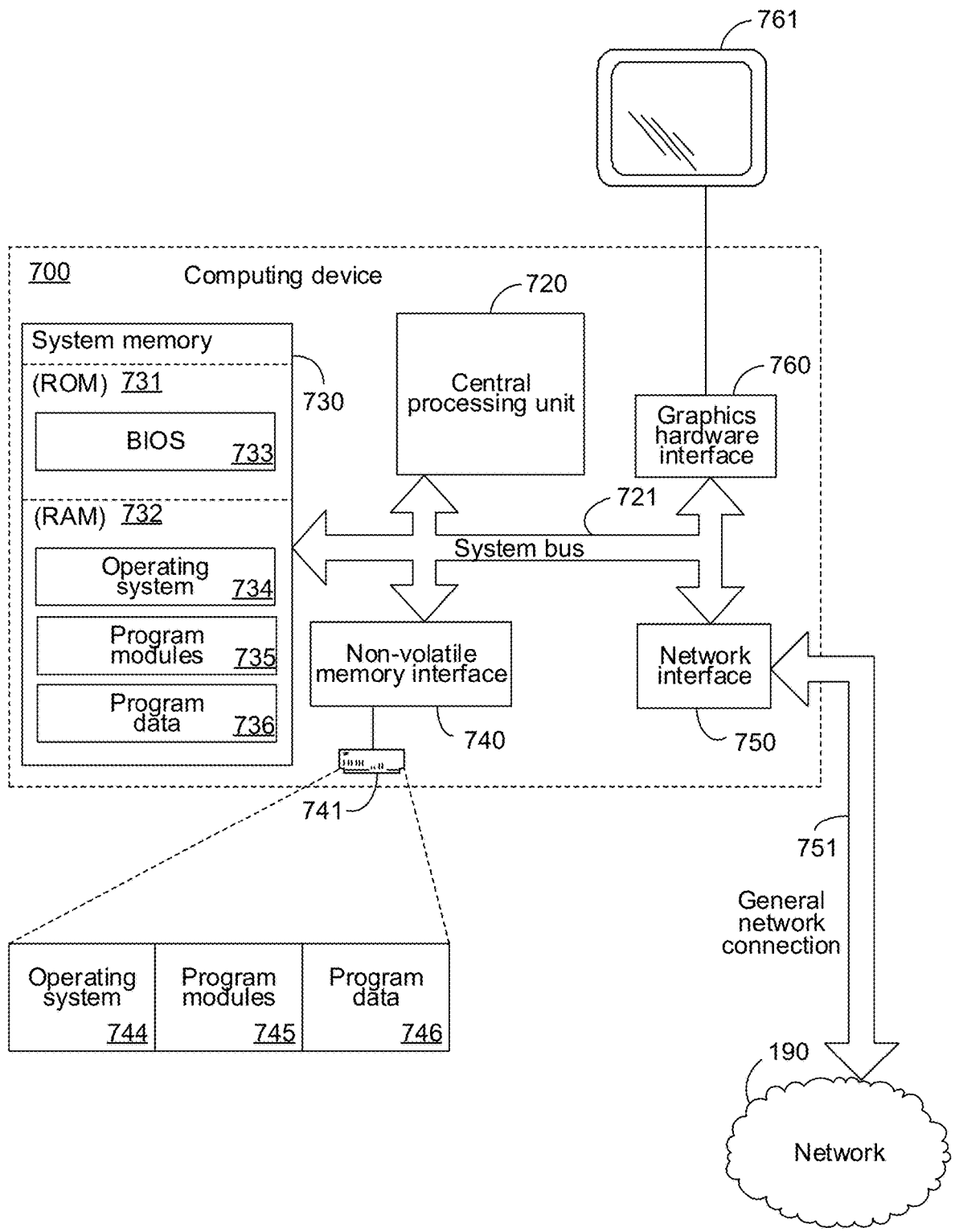
FIG. 7 is a block diagram of an exemplary computing device.

Turning to FIG. 7, an exemplary computing device 700 is illustrated which can perform some or all of the mechanisms and actions described above. The exemplary computing device 700 can include, but is not limited to, one or more central processing units (CPUs) 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. The computing device 700 can optionally include graphics hardware, including, but not limited to, a graphics hardware interface 760 and a display device 761, which can include display devices capable of receiving touch-based user input, such as a touch-sensitive, or multi-touch capable, display device. The display device 761 can further include a virtual reality display device, which can be a virtual reality headset, a mixed reality headset, an augmented reality headset, and other like virtual reality display devices. As will be recognized by those skilled in the art, such virtual reality display devices comprise either two physically separate displays, such as LCD displays, OLED displays or other like displays, where each physically separate display generates an image presented to a single one of a user's two eyes, or they comprise a single display device associated with lenses or other like visual hardware that divides the display area of such a single display device into areas such that, again, each single one of the user's two eyes receives a slightly different generated image. The differences between such generated images are then interpreted by the user's brain to result in what appears, to the user, to be a fully three-dimensional environment.

Returning to FIG. 7, depending on the specific physical implementation, one or more of the CPUs 720, the system memory 730 and other components of the computing device 700 can be physically co-located, such as on a single chip. In such a case, some or all of the system bus 721 can be nothing more than silicon pathways within a single chip structure and its illustration in FIG. 7 can be nothing more than notational convenience for the purpose of illustration.

The computing device 700 also typically includes computer readable media, which can include any available media that can be accessed by computing device 700 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 700. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer content between elements within computing device 700, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, other program modules 735, and program data 736.

The computing device 700 may also include other removable/non-removable, volatile/nonvolatile computer storage media. By way of example only, FIG. 7 illustrates a hard disk drive 741 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 741 is typically connected to the system bus 721 through a non-volatile memory interface such as interface 740.

The drives and their associated computer storage media discussed above and illustrated in FIG. 7, provide storage of computer readable instructions, data structures, program modules and other data for the computing device 700. In FIG. 7, for example, hard disk drive 741 is illustrated as storing operating system 744, other program modules 745, and program data 746. Note that these components can either be the same as or different from operating system 734, other program modules 735 and program data 736. Operating system 744, other program modules 745 and program data 746 are given different numbers hereto illustrate that, at a minimum, they are different copies.

The computing device 700 may operate in a networked environment using logical connections to one or more remote computers. The computing device 700 is illustrated as being connected to the general network connection 751 (to the network 190) through a network interface or adapter 750, which is, in turn, connected to the system bus 721. In a networked environment, program modules depicted relative to the computing device 700, or portions or peripherals thereof, may be stored in the memory of one or more other computing devices that are communicatively coupled to the computing device 700 through the general network connection 751. It will be appreciated that the network connections shown are exemplary and other means of establishing a communications link between computing devices may be used.

Although described as a single physical device, the exemplary computing device 700 can be a virtual computing device, in which case the functionality of the above-described physical components, such as the CPU 720, the system memory 730, the network interface 740, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 700 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example one or more computer-readable storage media comprising computer-executable instructions, which, when executed by one or more processing units of one or more computing devices, cause the one or more computing devices to: render, as an image onto a two-dimensional surface represented by an inside of a sphere, a three-dimensional environment as perceived by a viewer at a center of the sphere, wherein the rendering comprises generating both texture information and depth information for the image, the depth information being based on a location of a viewer as compared with location of objects in the three-dimensional environment; apply a stencil buffer to the rendered two-dimensional image, leaving only a first portion of the rendered two-dimensional image; generate, for display through a virtual-reality display device, a simulated three-dimensional thumbnail image that is representative of the three-dimensional environment by parallax shading the first portion of the rendered two-dimensional image based on the depth information and a location of a right eye of a viewer and separately parallax shading the first portion of the rendered two-dimensional image based on the depth information and a location of a left eye of the viewer; and regenerating, for display through the virtual-reality display device, the simulated three-dimensional thumbnail image by again parallax shading the first portion of the rendered two-dimensional image based on the depth information and a new location of the right eye of the viewer and separately again parallax shading the first portion of the rendered two-dimensional image based on the depth information and a new location of the left eye of the viewer, wherein the new location of the right eye and the new location of the left eye are because the viewer moved their head, the regenerating in response to the viewer moving their head causing the simulated three-dimensional thumbnail image to appear, to the viewer, through the virtual-reality display device, to behave as a three-dimensional object.

A second example is the computer-readable storage media of the first example, further comprising computer-executable instructions which, when executed by the one or more processing units of the one or more computing devices, cause the one or more computing devices to further: re-execute the computer-executable instructions of claim 1 for multiple other three-dimensional environments to generate, and then regenerate in response to the user moving their head, multiple other simulated three-dimensional thumbnail images on a same interface.

A third example is the computer-readable storage media of the first example, further comprising computer-executable instructions which, when executed by the one or more processing units of the one or more computing devices, cause the one or more computing devices to further: store the first portion of the rendered two-dimensional image in a thumbnail file.

A fourth example is the computer-readable storage media of the first example, further comprising computer-executable instructions which, when executed by the one or more processing units of the one or more computing devices, cause the one or more computing devices to further: generate, for display through the virtual-reality display device, a ghost user, the ghost user being a representation of a user at a different point in a virtual reality environment, the ghost user comprising an indication of both a position and an orientation of the ghost user; and generate, for display through the virtual-reality display device, a preview window comprising a generated view of the virtual reality environment as it would be seen by a user positioned at the indicated position of the ghost user and oriented as the indicated orientation of the ghost user.

A fifth example is the computer-readable storage media of the fourth example, wherein the ghost user comprises an indication of a scale of the ghost user as compared with the virtual reality environment.

A sixth example is the computer-readable storage media of the fourth example, further comprising computer-executable instructions which, when executed by the one or more processing units of the one or more computing devices, cause the one or more computing devices to further: regenerate, for display through the virtual-reality display device, the ghost user in response to user action directed towards the ghost user, the user action repositioning or reorienting the ghost user; and generate, for display through the virtual-reality display device, the preview window in accordance with the repositioning or reorienting of the ghost user.

A seventh example is the computer-readable storage media of the fourth example, further comprising computer-executable instructions which, when executed by the one or more processing units of the one or more computing devices, cause the one or more computing devices to further: regenerate, for display through the virtual-reality display device, in response to user action directed to a viewpoint switch visual element that is visually displayed proximate to the ghost user, the virtual reality environment as if the user was positioned at the indicated position of the ghost user and oriented as the indicated orientation of the ghost user.

An eighth example is the computer-readable storage media of the seventh example, further comprising computer-executable instructions which, when executed by the one or more processing units of the one or more computing devices, cause the one or more computing devices to further: regenerate, for display through the virtual-reality display device, in response to a second user action, the virtual reality environment as if the user was again positioned at a same position as when the user directed the user action to the viewpoint switch visual element.

A ninth example is the computer-readable storage media of the eighth example, wherein the position and orientation of the ghost user after the second user action is based on a last position and orientation of the user prior to the second user action.

A tenth example is the computer-readable storage media of the first example, further comprising computer-executable instructions which, when executed by the one or more processing units of the one or more computing devices, cause the one or more computing devices to further: generate, for display through the virtual-reality display device, a shelf within a virtual reality environment; generate, for display through the virtual-reality display device, in response to a user dragging an object from another part of the virtual reality environment onto the shelf, a visually smaller version of the object visually displayed on the shelf; and write, in response to the user dragging the object from the other part of the virtual reality environment onto the shelf, three-dimensional object data, defining the object, into a clipboard data storage.

An eleventh example is the computer-readable storage media of the first example, further comprising computer-executable instructions which, when executed by the one or more processing units of the one or more computing devices, cause the one or more computing devices to further: generate, for display through the virtual-reality display device, a shelf within a virtual reality environment, the shelf having visually displayed on it a visually smaller version of an object; generate, for display through the virtual-reality display device, the object in another part of the virtual reality environment, in response to a user dragging the visually smaller version of the object from the shelf the other part of the virtual reality environment; and obtain, in response to the user dragging the visually smaller version of the object from the shelf the other part of the virtual reality environment, three-dimensional object data, defining the object, from a clipboard data storage.

A twelfth example is the computer-readable storage media of the first example, further comprising computer-executable instructions which, when executed by the one or more processing units of the one or more computing devices, cause the one or more computing devices to further: generate, for display through the virtual-reality display device, an object within a virtual reality environment; detect a first user action directed to a first part of the object, the first user action being performed with a first arm of the user; detect a second user action directed to a second part of the object, the second user action being performed with a second arm of the user; detect a third user action comprising at least one of: moving the first arm of the user away from the second arm of the user, moving the second arm of the user away from the first arm of the user, or moving both arms of the user away from each other; generate, for display through the virtual-reality display device, in response to the detecting the third user action, a non-uniformly resized version of the object, the non-uniformly resized version of the object differing in size from the object along an axis defined by the first part of the object and the second part of the object, the difference in size corresponding to a ratio between a current distance between the arms of the user and a distance between the arms of the user prior to the third user action.

A thirteenth example is the computer-readable storage media of the twelfth example, further comprising computer-executable instructions which, when executed by the one or more processing units of the one or more computing devices, cause the one or more computing devices to further: detect a user input prior to the second user action; and generate, in response to the detected user input, a uniformly resized version of the object, the uniformly resized version of the object differing in size from the object based on a magnitude of the detected user input.

A fourteenth example is the computer-readable storage media of the twelfth example, further comprising computer-executable instructions which, when executed by the one or more processing units of the one or more computing devices, cause the one or more computing devices to further: generate, for display through the virtual-reality display device, in response to detecting an initiation of the second user action, anchor points visually displayed on one or more locations of the object, the one or more locations comprising the second part of the object.

A fifteenth example is one or more computer-readable storage media comprising computer-executable instructions, which, when executed by one or more processing units of one or more computing devices, cause the one or more computing devices to: generate, for display through a virtual-reality display device, a ghost user, the ghost user being a representation of a user at a different point in a virtual reality environment, the ghost user comprising an indication of both a position and an orientation of the ghost user; and generate, for display through the virtual-reality display device, a preview window comprising a generated view of the virtual reality environment as it would be seen by a user positioned at the indicated position of the ghost user and oriented as the indicated orientation of the ghost user.

A sixteenth example is the computer-readable storage media of the fifteenth example, further comprising computer-executable instructions which, when executed by the one or more processing units of the one or more computing devices, cause the one or more computing devices to further: regenerate, for display through the virtual-reality display device, the ghost user in response to user action directed towards the ghost user, the user action repositioning or reorienting the ghost user; and generate, for display through the virtual-reality display device, the preview window in accordance with the repositioning or reorienting of the ghost user.

A seventeenth example is the computer-readable storage media of the fifteenth example, further comprising computer-executable instructions which, when executed by the one or more processing units of the one or more computing devices, cause the one or more computing devices to further: regenerate, for display through the virtual-reality display device, in response to user action directed to a viewpoint switch visual element that is visually displayed proximate to the ghost user, the virtual reality environment as if the user was positioned at the indicated position of the ghost user and oriented as the indicated orientation of the ghost user; and regenerate, for display through the virtual-reality display device, in response to a second user action, the virtual reality environment as if the user was again positioned at a same position as when the user directed the user action to the viewpoint switch visual element.

An eighteenth example is the computer-readable storage media of the fifteenth example, further comprising computer-executable instructions which, when executed by the one or more processing units of the one or more computing devices, cause the one or more computing devices to further: generate, for display through the virtual-reality display device, an object within a virtual reality environment; detect a first user action directed to a first part of the object, the first user action being performed with a first arm of the user; detect a second user action directed to a second part of the object, the second user action being performed with a second arm of the user; detect a third user action comprising at least one of: moving the first arm of the user away from the second arm of the user, moving the second arm of the user away from the first arm of the user, or moving both arms of the user away from each other; generate, for display through the virtual-reality display device, in response to the detecting the third user action, a non-uniformly resized version of the object, the non-uniformly resized version of the object differing in size from the object along an axis defined by the first part of the object and the second part of the object, the difference in size corresponding to a ratio between a current distance between the arms of the user and a distance between the arms of the user prior to the third user action.

A nineteenth example is one or more computer-readable storage media comprising computer-executable instructions, which, when executed by one or more processing units of one or more computing devices, cause the one or more computing devices to: generate, for display through a virtual-reality display device, an object within a virtual reality environment; detect a first user action directed to a first part of the object, the first user action being performed with a first arm of the user; detect a second user action directed to a second part of the object, the second user action being performed with a second arm of the user; detect a third user action comprising at least one of: moving the first arm of the user away from the second arm of the user, moving the second arm of the user away from the first arm of the user, or moving both arms of the user away from each other; generate, for display through the virtual-reality display device, in response to the detecting the third user action, a non-uniformly resized version of the object, the non-uniformly resized version of the object differing in size from the object along an axis defined by the first part of the object and the second part of the object, the difference in size corresponding to a ratio between a current distance between the arms of the user and a distance between the arms of the user prior to the third user action.

A twentieth example is the one or more computer-readable storage media of the nineteenth example, further comprising computer-executable instructions which, when executed by the one or more processing units of the one or more computing devices, cause the one or more computing devices to further: generate, for display through the virtual-reality display device, a shelf within a virtual reality environment; generate, for display through the virtual-reality display device, in response to a user dragging an object from another part of the virtual reality environment onto the shelf, a visually smaller version of the object visually displayed on the shelf; and write, in response to the user dragging the object from the other part of the virtual reality environment onto the shelf, three-dimensional object data, defining the object, into a clipboard data storage.

As can be seen from the above descriptions, mechanisms for scalably generating and provision computing environments have been presented. In view of the many possible variations of the subject matter described herein, we claim as our invention all such embodiments as may come within the scope of the following claims and equivalents thereto.

We claim:

1. One or more computer storage media comprising computer-executable instructions, which, when executed by one or more processing units of one or more computing devices, cause the one or more computing devices to:
    render, as an image onto a two-dimensional surface represented by an inside of a sphere, a three-dimensional environment as perceived by a viewer at a center of the sphere, wherein the rendering comprises generating both texture information and depth information for the image, the depth information being based on a location of a viewer as compared with location of objects in the three-dimensional environment;

apply a stencil buffer to the rendered two-dimensional image, leaving only a first portion of the rendered two-dimensional image;

generate, for display through a virtual-reality display device, a simulated three-dimensional thumbnail image that is representative of the three-dimensional environment by parallax shading the first portion of the rendered two-dimensional image based on the depth information and a location of a right eye of a viewer and separately parallax shading the first portion of the rendered two-dimensional image based on the depth information and a location of a left eye of the viewer; and regenerating, for display through the virtual-reality display device, the simulated three-dimensional thumbnail image by again parallax shading the first portion of the rendered two-dimensional image based on the depth information and a new location of the right eye of the viewer and separately again parallax shading the first portion of the rendered two-dimensional image based on the depth information and a new location of the left eye of the viewer, wherein the new location of the right eye and the new location of the left eye are because the viewer moved their head, the regenerating in response to the viewer moving their head causing the simulated three-dimensional thumbnail image to appear, to the viewer, through the virtual-reality display device, to behave as a three-dimensional object.

2. The computer storage media of claim 1, further comprising computer-executable instructions which, when executed by the one or more processing units of the one or more computing devices, cause the one or more computing devices to further:

re-execute the computer-executable instructions of claim 1 for multiple other three-dimensional environments to generate, and then regenerate in response to the user moving their head, multiple other simulated three-dimensional thumbnail images on a same interface.

3. The computer storage media of claim 1, further comprising computer-executable instructions which, when executed by the one or more processing units of the one or more computing devices, cause the one or more computing devices to further: store the first portion of the rendered two-dimensional image in a thumbnail file.

4. The computer storage media of claim 1, further comprising computer-executable instructions which, when executed by the one or more processing units of the one or more computing devices, cause the one or more computing devices to further:

generate, for display through the virtual-reality display device, a ghost user, the ghost user being a representation of a user at a different point in a virtual reality environment, the ghost user comprising an indication of both a position and an orientation of the ghost user; and generate, for display through the virtual-reality display device, a preview window comprising a generated view of the virtual reality environment as it would be seen by a user positioned at the indicated position of the ghost user and oriented as the indicated orientation of the ghost user.

5. The computer storage media of claim 4, wherein the ghost user comprises an indication of a scale of the ghost user as compared with the virtual reality environment.

6. The computer storage media of claim 4, further comprising computer-executable instructions which, when executed by the one or more processing units of the one or more computing devices, cause the one or more computing devices to further:

regenerate, for display through the virtual-reality display device, the ghost user in response to user action directed towards the ghost user, the user action repositioning or reorienting the ghost user; and generate, for display through the virtual-reality display device, the preview window in accordance with the repositioning or reorienting of the ghost user.

7. The computer storage media of claim 4, further comprising computer-executable instructions which, when executed by the one or more processing units of the one or more computing devices, cause the one or more computing devices to further:

regenerate, for display through the virtual-reality display device, in response to user action directed to a viewpoint switch visual element that is visually displayed proximate to the ghost user, the virtual reality environment as if the user was positioned at the indicated position of the ghost user and oriented as the indicated orientation of the ghost user.

8. The computer storage media of claim 7, further comprising computer-executable instructions which, when executed by the one or more processing units of the one or more computing devices, cause the one or more computing devices to further:

regenerate, for display through the virtual-reality display device, in response to a second user action, the virtual reality environment as if the user was again positioned at a same position as when the user directed the user action to the viewpoint switch visual element.

9. The computer storage media of claim 8, wherein the position and orientation of the ghost user after the second user action is based on a last position and orientation of the user prior to the second user action.

10. The computer storage media of claim 1, further comprising computer-executable instructions which, when executed by the one or more processing units of the one or more computing devices, cause the one or more computing devices to further:

generate, for display through the virtual-reality display device, a shelf within a virtual reality environment;

generate, for display through the virtual-reality display device, in response to a user dragging an object from another part of the virtual reality environment onto the shelf, a visually smaller version of the object visually displayed on the shelf; and write, in response to the user dragging the object from the other part of the virtual reality environment onto the shelf, three-dimensional object data, defining the object, into a clipboard data storage.

11. The computer storage media of claim 1, further comprising computer-executable instructions which, when executed by the one or more processing units of the one or more computing devices, cause the one or more computing devices to further:

generate, for display through the virtual-reality display device, a shelf within a virtual reality environment, the shelf having visually displayed on it a visually smaller version of an object;

generate, for display through the virtual-reality display device, the object in another part of the virtual reality environment, in response to a user dragging the visually smaller version of the object from the shelf the other part of the virtual reality environment; and obtain, in response to the user dragging the visually smaller version of the object from the shelf the other part of the virtual reality environment, three-dimensional object data, defining the object, from a clipboard data storage.

12. The computer storage media of claim 1, further comprising computer-executable instructions which, when executed by the one or more processing units of the one or more computing devices, cause the one or more computing devices to further:
generate, for display through the virtual-reality display device, an object within a virtual reality environment;
detect a first user action directed to a first part of the object, the first user action being performed with a first arm of the user;
detect a second user action directed to a second part of the object, the second user action being performed with a second arm of the user;
detect a third user action comprising at least one of: moving the first arm of the user away from the second arm of the user, moving the second arm of the user away from the first arm of the user, or moving both arms of the user away from each other;
generate, for display through the virtual-reality display device, in response to the detecting the third user action, a non-uniformly resized version of the object, the non-uniformly resized version of the object differing in size from the object along an axis defined by the first part of the object and the second part of the object, the difference in size corresponding to a ratio between a current distance between the arms of the user and a distance between the arms of the user prior to the third user action.

13. The computer storage media of claim 12, further comprising computer-executable instructions which, when executed by the one or more processing units of the one or more computing devices, cause the one or more computing devices to further:
detect a user input prior to the second user action; and
generate, in response to the detected user input, a uniformly resized version of the object, the uniformly resized version of the object differing in size from the object based on a magnitude of the detected user input.

14. The computer storage media of claim 12, further comprising computer-executable instructions which, when executed by the one or more processing units of the one or more computing devices, cause the one or more computing devices to further:
generate, for display through the virtual-reality display device, in response to detecting an initiation of the second user action, anchor points visually displayed on one or more locations of the object, the one or more locations comprising the second part of the object.

15. A method of controlling a display of a virtual-reality display device, the method comprising:
rendering, as an image onto a two-dimensional surface represented by an inside of a sphere, a three-dimensional environment as perceived by a viewer at a center of the sphere, wherein the rendering comprises generating both texture information and depth information for the image, the depth information being based on a location of a viewer as compared with location of objects in the three-dimensional environment;
applying a stencil buffer to the rendered two-dimensional image, leaving only a first portion of the rendered two-dimensional image;
generating, for display through the virtual-reality display device, a simulated three-dimensional thumbnail image that is representative of the three-dimensional environment by parallax shading the first portion of the rendered two-dimensional image based on the depth information and a location of a right eye of a viewer and separately parallax shading the first portion of the rendered two-dimensional image based on the depth information and a location of a left eye of the viewer; and
regenerating, for display through the virtual-reality display device, the simulated three-dimensional thumbnail image by again parallax shading the first portion of the rendered two-dimensional image based on the depth information and a new location of the right eye of the viewer and separately again parallax shading the first portion of the rendered two-dimensional image based on the depth information and a new location of the left eye of the viewer, wherein the new location of the right eye and the new location of the left eye are because the viewer moved their head, the regenerating in response to the viewer moving their head causing the simulated three-dimensional thumbnail image to appear, to the viewer, through the virtual-reality display device, to behave as a three-dimensional object.

16. The method of claim 15, further comprising:
generating, for display through the virtual-reality display device, a ghost user, the ghost user being a representation of a user at a different point in a virtual reality environment, the ghost user comprising an indication of both a position and an orientation of the ghost user; and
generating, for display through the virtual-reality display device, a preview window comprising a generated view of the virtual reality environment as it would be seen by a user positioned at the indicated position of the ghost user and oriented as the indicated orientation of the ghost user.

17. The method of claim 15, further comprising:
generating, for display through the virtual-reality display device, a shelf within a virtual reality environment;
generating, for display through the virtual-reality display device, in response to a user dragging an object from another part of the virtual reality environment onto the shelf, a visually smaller version of the object visually displayed on the shelf; and
writing, in response to the user dragging the object from the other part of the virtual reality environment onto the shelf, three-dimensional object data, defining the object, into a clipboard data storage.

18. The method of claim 15, further comprising:
generating, for display through the virtual-reality display device, a shelf within a virtual reality environment, the shelf having visually displayed on it a visually smaller version of an object;
generating, for display through the virtual-reality display device, the object in another part of the virtual reality environment, in response to a user dragging the visually smaller version of the object from the shelf the other part of the virtual reality environment; and
obtaining, in response to the user dragging the visually smaller version of the object from the shelf the other part of the virtual reality environment, three-dimensional object data, defining the object, from a clipboard data storage.

19. The method of claim 15, further comprising:

generating, for display through the virtual-reality display device, an object within a virtual reality environment;

detecting a first user action directed to a first part of the object, the first user action being performed with a first arm of the user;

detecting a second user action directed to a second part of the object, the second user action being performed with a second arm of the user;

detecting a third user action comprising at least one of: moving the first arm of the user away from the second arm of the user, moving the second arm of the user away from the first arm of the user, or moving both arms of the user away from each other;

generating, for display through the virtual-reality display device, in response to the detecting the third user action, a non-uniformly resized version of the object, the non-uniformly resized version of the object differing in size from the object along an axis defined by the first part of the object and the second part of the object, the difference in size corresponding to a ratio between a current distance between the arms of the user and a distance between the arms of the user prior to the third user action.

20. A computing device comprising:

one or more hardware processing units; and one or more computer storage media comprising computer-executable instructions, which, when executed by the one or more hardware processing units, cause the computing device to:

render, as an image onto a two-dimensional surface represented by an inside of a sphere, a three-dimensional environment as perceived by a viewer at a center of the sphere, wherein the rendering comprises generating both texture information and depth information for the image, the depth information being based on a location of a viewer as compared with location of objects in the three-dimensional environment;

apply a stencil buffer to the rendered two-dimensional image, leaving only a first portion of the rendered two-dimensional image;

generate, for display through a virtual-reality display device that is communicationally coupled to the computing device, a simulated three-dimensional thumbnail image that is representative of the three-dimensional environment by parallax shading the first portion of the rendered two-dimensional image based on the depth information and a location of a right eye of a viewer and separately parallax shading the first portion of the rendered two-dimensional image based on the depth information and a location of a left eye of the viewer; and regenerate, for display through the virtual-reality display device, the simulated three-dimensional thumbnail image by again parallax shading the first portion of the rendered two-dimensional image based on the depth information and a new location of the right eye of the viewer and separately again parallax shading the first portion of the rendered two-dimensional image based on the depth information and a new location of the left eye of the viewer, wherein the new location of the right eye and the new location of the left eye are because the viewer moved their head, the regenerating in response to the viewer moving their head causing the simulated three-dimensional thumbnail image to appear, to the viewer, through the virtual-reality display device, to behave as a three-dimensional object.

\* \* \* \* \*